United States Patent Office 2,773,044
Patented Dec. 4, 1956

2,773,044

PIGMENTED ORGANIC PLASTICS AND METHOD FOR PREPARING THE SAME

Vincent C. Vesce, Smoke Rise, Kinnelon, N. J., assignor to The B. F. Goodrich Company, New York, N. Y., a corporation of New York No Drawing. Application June 2, 1953, Serial No. 359,222

14 Claims. (Cl. 260—22)

This invention relates to pigmented compositions and more particularly relates to the production of pigmented compositions of matter suitable for the coloring of plastics generally and specifically in the present application to the pigmentation of one of the classes of resin plastics, namely, alkyd resin plastics, disclosed in my prior application Ser. No. 108,423, filed August 3, 1949, now U. S. Patent 2,649,382, of which this present application is a continuation-in-part.

The production of plastic masses containing dispersed pigment for incorporation into large batches for coloring purposes is not broadly new. Such dispersions are known in the industry as "color master batches." In the production of alkyd resin plastic color master batches heretofore it has been necessary to submit pigment and plastic to prolonged and expensive mechanical working in equipment capable of exerting high shearing stresses in order to achieve a dispersion of pigment in plastic of moderately satisfactory quality. In such prior operations, the milling times are considerable, the power requirements for such equipment very high, the constant attendance of skilled labor is required, and the degree of dispersion obtained leaves much to be desired when a very fine degree of dispersion is required.

Other major disadvantages in the prior processes of producing alkyd resin plastic color master batches lie in the pigmented product itself, which generally contains heat-fused lumps of colored plastic of extremely hard character and of relatively difficult solubility, due to the unavoidable heating of the plastic in the drastic milling operation, and further the chromaticity of the pigmented product is low, also due to conditions obtaining during the drastic milling operation.

I have discovered that alkyd resin plastic color master batches of extremely high quality can be prepared in an efficient manner with simple inexpensive milling of pigment and alkyd resin plastic by the use of a novel and special type of liquid grinding medium, which later can be easily removed from the milled batch, and even reused, if desired, for new batches. After the removal of the liquid grinding medium from the milled batch, the dispersed pigment-in-plastic solids are dried, the dried alkyd resin plastic master color batch being normally in a free-flowing particulate form, which is soft in texture and can be easily reduced to a very fine powdery consistency.

The alkyd resin plastic master color batches produced in the novel process above recited are stable, uniform and free from agglomerates, have a high chromaticity, and, when used to color plastic masses, make available the full strength of the pigment employed.

One object of this invention is the production of an alkyd resin plastic master color batch, which requires only simple, inexpensive milling in its preparation.

Further objects of this invention will be apparent from the detailed specifications which follow.

In practicing the invention of this application, I place in a ball, pebble or other colloidal mill a mixture consisting essentially of the alkyd resin plastic to be pigmented, the specific pigment, and the novel liquid grinding medium comprising a liquid organic solvent for the alkyd resin plastic to be pigmented characterized additionally by its water-miscibility, and water. Both the plastic and the pigment may be in particulate form. The organic solvent and water are present in the novel liquid grinding medium in such proportions that the liquid grinding medium does not dissolve a substantial amount of the plastic and does not cause substantial agglomeration of the plastic. The balls or pebbles or other solid grinding elements are added to the mixture of plastic, pigment and liquid grinding medium, the mill closed and allowed to grind the mixture, without necessity for any attendant, until a dispersion of pigment in plastic of the desired degree is obtained.

The alkyd resin plastics which are embodied in the specification as illustrative of the invention of this application are alkyd resin plastics of normally solid structure, substantially insoluble in water and at least partially soluble in an organic solvent which is miscible with water. Such a plastic is hereinafter in this specification and in the appended claims termed an "alkyd resin plastic." Many alkyd resin plastics, but by no means all such resin plastics, are enumerated and classified in volume V, chapter 1, of "Protective and Decorative Coatings," edited by Joseph J. Mattiello, Ph. D., and published in 1946 by John Wiley & Sons, Inc., of New York.

On page 3 and pages 25 to 28 of the above-identified publication, Mattiello classifies the alkyd resin plastics, which fall within the term "alkyd resin plastics" as herein employed, as including—

(1) Basic alkyd resin plastics, namely, the reaction products of polybasic organic acids and polyhydroxy alcohols, or unsaturated alcohols;

(2) Modified alkyd resin plastics, namely, the reaction products of (1) above in which one or more additional constituents are introduced prior to the reaction, such additional constituents comprising (a) acids from drying and/or non-drying oils, called oil-modified alkyd resins; (b) natural resins, such as rosin and Congo copal, called natural resin-modified alkyd resins; (c) synthetic resins, such as phenolic and amine aldehyde resins, called synthetic resin-modified alkyd resins; and (d) monomers, such as styrene, called styrene-modified alkyd resins.

Basic alkyd resin plastics comprise a class of synthetic polymeric resin plastics based on the reaction between a polybasic organic acid (or anhydride) and polyhydroxy or unsaturated alcohol. Thus, when an organic acid containing two or more carboxyl (—COOH) groups, such as maleic acid,

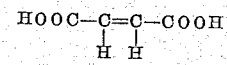

is reacted with an alcohol having two or more hydroxy (—OH) groups, such as ethylene glycol,

a long chain polyester is formed which is known as an alkyd resin. The polybasic organic acids (or anhydrides) normally employed are phthalic, maleic, fumaric, sebacic, succinic, adipic, glutaric, pimelic, suberic, azelaic, diglycolic, and other aliphatic high molecular weight polybasic acids (or anhydrides). The alcohols include such polyhydric alcohols as glycerol, glycols, penta- and dipentaerythritol, sorbitol, and unsaturated alcohols, such as allyl and methallyl alcohols.

It is here pointed out that either the polybasic organic acid or anhydride may be used in the production of alkyd resin plastics. For convenience, the terms used herein to designate either a polybasic organic acid or a polybasic organic anhydride are used in a broad sense in the specification and claims to include both the acid and the anhydride. Thus, phthalic anhydride is considered to be generic to both phthalic acid and phthalic anhydride.

Modified alkyd resin plastics comprise a useful class of synthetic polymeric materials and are the type of alkyd resins commonly used in industrial operations. The modified alkyd resin plastics are usually produced by carrying out the reaction producing the basic alkyd resin plastic with one or more modifying agents, such as acids from vegetable oils or fatty acids, rosin or rosin derivatives, natural resins, phenolic and amine aldehyde condensates, or unsaturated monomers, such as styrene.

Commercial alkyd resin plastics may be divided into three major groups: phthalic alkyd resin plastics, maleic alkyd resin plastics, and other alkyd resin plastics. The physicochemical characteristics of basic alkyd resin plastics may be altered at will by the introduction of one or more additional constituents. Common modifiers include styrene, rosin, Congo copal, drying and non-drying oils, phenolic condensates, maleic resin condensates and combinations of the above.

In the production of modified alkyd resin plastics, the acid or anhydride raw material may not only be phthalic, fumaric, maleic and other polybasic organic acids or anhydrides, but also adduct acids, such as rosin-maleic, terpene-maleic, drying oil-maleic, carbic anhydride, and the like.

As examples of commercial alkyd resin plastics of this invention, the following specific alkyd resin plastics are given:

1. Phthalic anhydride is reacted with glycerol and linoleic acid to produce a commercial modified phthalic alkyd resin plastic, known in the trade as Glyptal, Rezyl and Duraplex.

2. Maleic (or its isomer, fumaric) anhydride is reacted with diglycol and styrene to produce a styrene-modified maleic alkyd resin plastic, marketed under the trade name Thalid.

3. Maleic (or its isomer, fumaric) anhydride is reacted with rosin (abietic acid) to produce a rosin-maleic adduct, which is then reacted with glycerol (or other polyhdric alcohol) to produce a commercial dibasic acid or rosin-modified maleic alkyd resin plastic, marketed under the trade names, Amberol, Beckacite and Teglac.

4. Maleic anhydride is reacted with dipentene to form a maleic adduct, which is then reacted with glycerol and linoleic acid to produce a commercial modified maleic alkyd resin plastic, known in the trade as Petrex.

5. Maleic anhydride is reacted with cyclopentadiene to produce a maleic adduct, which is then reacted with glycerol and linoleic acid to form a modified maleic alkyd resin plastic, known in the trade as Carbic or C-9.

6. Sebacic acid is reacted with castor oil to produce an adduct, recinoleic acid, which is then reacted with glycerol to produce a modified sebacic alkyd resin plastic, known in the trade as Paraplex.

Other alkyd resin plastics have been produced commercially, such as glyceryl phthalate, ethylene glycol phthalate, dicylohexyl phthalate, glycerol rosin-maleate, drying oil-modified glycerol phthalate, rosin-modified glycerol phthalate, phenolic-modified glycerol phthalate, etc.

It is to be understood that the above-enumerated alkyd resin plastics are given by way of illustration only of the class of resin plastics comprehended within the term "alkyd resin plastics" as that term is defined hereinabove and is employed in this specification and in the appended claims.

As pigment, one may employ any of the solid colorants normally used in the industry for the coloring, opacifying, delustering or otherwise modifying the color of the alkyd resin plastic. These include the inorganic prime pigments, organic prime pigments, various inert or extender pigments, metallic pigments and the various bone and gas blacks, such as disclosed in Mattiello "Protective and Decorative Coatings," vol. 2, chapter 1 (1942), or the Journal of the Society of Dyers and Colorists, vol. 61 (307), December 1945.

As an essential feature of the invention, the alkyd resin plastic and pigment are mixed with a liquid grinding medium comprising water and a liquid organic water-miscible solvent for the plastic employed. It is important that the mixture of water and solvent be present in such proportions in the liquid grinding medium that, during the time of processing, the mixture of liquid organic solvent and water does not substantially dissolve the alkyd resin plastic or substantially cause it to gell or agglomerate.

To accurately find the point at which the liquid organic solvent and water liquid grinding medium becomes substantially a non-solvent for the alkyd resin plastic, a series of test specimens can be made up comprising the selected solvent with various percentages of water. Such solutions may vary in 5% or 10% increments depending upon the precision desired. Thus, as an example, one may fill nine oil bottles with water-solvent solutions varying from 10% to 90% water by weight. A small amount of the alkyd resin plastic is then added to each bottle, preferably in the physical form in which it is to be used and in an amount of about 1 part of alkyd resin plastic to 4 parts of liquid medium. The mixture is well agitated and the alkyd resin plastic is then permitted to settle.

One may note that in one or more of the bottles the alkyd resin plastic either goes completely into solution or clumps or agglomerates into a more or less translucent, gell-like mass. It will also be noted that in the remaining bottles, the plastic retains a discrete particle appearance. While these effects can generally be observed almost immediately, it is better to permit about 4 hours of contact before comparisons are made and still more preferably one may allow as much time for contact as is to be given during the actual pigment dispersion operation.

The action of the mixture of water and liquid organic solvent on the alkyd resin plastic when it is less drastic than that which causes a gelling and agglomeration of the alkyd resin plastic and yet contains sufficient solvent to make the alkyd resin plastic receptive to pigment dispersion can best be termed a "pigment receptive action" on the plastic.

The most desirable and optimum water-organic solvent liquid grinding medium has been found to be the one having that proportion of water just sufficient to prevent the above-mentioned extensive solvent action, and yet have enough solvent present to attack the alkyd resin plastic and make it receptive to the entrance and dispersion of pigment. It should be clearly understood, however, that for operability there is no precise percentage of solvent in water or precise point where the liquid medium imparts the receptive quality to the alkyd resin plastic but, rather, a range which may vary from about 2 or 3 percent—in the case of particular solvents and particular alkyd resin plastics—to as much as about 90% with other solvents and alkyd resin plastics. The indication that the amount of solvent is "approximately" below that which results in substantial gelling or agglomeration is intended to cover that range where the pigment receptive action on the alkyd resin plastic takes place.

The amount of liquid grinding medium comprising liquid organic solvent and water, used in the process, is selected by the operator to be sufficient to give fluidity to the solids in the particular mill used in the process. A mill with flint pebbles, for example, will generally require more liquid grinding medium than one using steel balls. It is, of course, obvious that one may, if so desired, use other types of mills for the grinding operation.

Such liquid organic water-miscible solvents which will solubilize the alkyd resin plastics include the alcohols, as, for example, methyl, ethyl, isopropyl alcohol, diacetone alcohol, etc.; dioxane, the glycol ethers as, for example, the Cellosolves and the Carbitols; the esters, such as the Cellosolve acetates and methyl or ethyl lactate; the ketones, such as acetone, methyl-ethyl ketone; and other solevnts or mixture of solvents for the alkyd resin plastics well-known to the art.

For a better understanding of the invention, the following examples are given, it being clearly understood that these are merely by way of illustration and not to be considered limitative of the invention. References to the pigments employed utilize the generally accepted trade name. The letter "M" with figure and page number following the name refers to the figures and pages in vol. 5 of J. J. Mattiello's "Protective and Decorative Coatings" which gives the chemical composition. The designation "C. I." refers to the well-known colour index published by the Society of Dyers and Colourists.

Unless otherwise noted, all percentages are to be considered as being on a weight basis.

*Example 1*

A one-gallon porcelain pebble mill is charged with 159 grams of Tungstated Green Toner (M: Fig. 33, page 383) and 1322 grams of a grinding fluid containing 10% acetone and 90% water. This is mixed well and to the mixture is added 318 grams of a rosin-modified maleic alkyd resin plastic, such as marketed by The Resinous Products and Chemical Company under the trade name Amberol 820. About 7 lbs. of #00 French flint pebbles are added. After milling for about 45 hours, the mill is discharged and rinsed out with water. The product and wash liquid are collected and filtered. The filter cake is then washed, dried and pulverized. One obtains 459 grams of a fine, bright soft-textured green powder which disperses readily into alcohol to form a highly dispersed system useful in aniline ink, lacquers, etc.

*Example 2*

In the above Example 1, for the Tungstated Green Toner pigment was substituted 572 grams of Benzidene Yellow Toner Presscake of 17.5% dry content (M: Fig. 49, page 391) and 518 grams additional water and 110 grams of acetone, the liquid grinding medium, exclusive of the pigment, containing 10% acetone and 90% water. The mill is run for 15 minutes to premix the presscake, water and acetone. There is then added 200 grams of the rosin-modified maleic alkyd resin plastic of the above example and about 7 lbs. of #00 French flint pebbles. After milling about 20 hours, the mill is discharged and rinsed out with water. The product and wash liquid are collected and filtered. The filter cake is then washed, dried and pulverized. There is obtained 286 grams of a fine soft-textured bright yellow powder suitable for use in the manufacture of spirit and rotogravure inks, lacquers, etc.

*Example 3*

A one-gallon porcelain pebble mill is charged with 300 grams of Para Toner, Light (M: Fig. 66, page 400) and 1500 grams of a liquid grinding medium containing 23% acetone and 77% water. This is well mixed and to the mixture is added 4½ grams of borax and 4½ grams of boric acid, and 225 grams of a dibasic acid-modified alkyd resin plastic, such as is marketed by American Cyanamid Co. under the trade name Teglac Z–152. About 7 lbs. of #00 French flint pebbles are added. After milling for about 45 hours, the mill is discharged and rinsed out with water. The product and wash liquid are collected and filtered. The filter cake is then washed, dried and pulverized. One obtains 513 grams of a fine soft-textured bright red powder consisting essentially of pigment and plastic which disperses readily into an oil-modified alkyd resin to produce a high luster smooth pigmented enamel.

In this example, the boric acid and borax were included to maintain neutrality, acting to neutralize the acidity of the Teglac resin plastic, which would otherwise possibly cause a modification of the quality of the pigment. Being water soluble, the neutralization agents are removed in the final washing step.

*Example 4*

In the above Example 3, for the pigment was substituted Para Red Toner (M: Fig. 66, page 400), and as liquid grinding medium 1200 grams consisting of 5% ethyl acetate and 95% water. After mixing well, there is added 200 grams of the dibasic acid-modified alkyd resin plastic of Example 3. After milling as before, and discharging, washing and filtering, the dried filter cake is pulverized. One obtains 395 grams of a red powder suitable for dissolving in a solvent for the preparation of a pigmented enamel.

The substitution of butanol for ethyl acetate does not materially change the operation or the product produced.

*Example 5*

A one-gallon porcelain pebble mill is charged with 300 grams of Toluidine Maroon Powder (M: Fig. 83, page 408) and 1200 grams of a liquid grinding medium containing 4% acetone and 96% water. This is mixed well and to the mixture is added 300 grams of glyceryl phthalate powder. About 7 lbs. of #00 French flint pebbles are added. After milling for about 70 hours, the mill is discharged and rinsed out with water. The product and wash liquid are collected and filtered. The filter cake is then washed, dried and pulverized. One obtains 556 grams of a dark maroon powder which disperses easily when cut into acetone.

*Example 6*

A one-gallon porcelain pebble mill is charged with 200 grams of Toluidine Maroon Powder (M: Fig. 83, page 408) and 1200 grams of a liquid grinding medium containing 30% denatured ethanol and 70% water. This is mixed well and to the mixture is added 200 grams of powdered dicyclohexyl phthalate, such as is marketed by Allied Chemical & Dye Corporation under the trade name Elastex DCHP. About 20 lbs. of steel balls, averaging ½" in diameter, are added. After milling for about 45 hours, the mill is discharged and rinsed out with water. The product and the wash liquid are collected and filtered. The filter cake is then washed and dried at 120° F., after which it is pulverized. One obtains 393 grams of a bright maroon non-dusting powder which disperses easily into nitrocellulose lacquers.

*Example 7*

A one-gallon porcelain pebble mill is charged with 150 grams of Phthalocyanine Blue Toner (M: Fig. 140, page 437) and 750 grams of a liquid grinding medium containing 9% acetone and 91% water. This is mixed well and to the mixture is added 150 grams of a phthalic alkyd resin plastic such as is produced by reacting phthalic anhydride with glycerol and linoleic acid and marketed under the trade name Glyptal ZV4010. About 7 lbs. of #00 French flint pebbles are added. After milling for an overnight period of 18 hours, the mill is discharged and rinsed out with water. The product and wash liquid are collected and filtered. The filter cake is then washed, dried and pulverized. One obtains 295 grams of a fine bright soft-textured blue powder which disperses readily into solvents, or enamel and lacquer combinations.

*Example 8*

A one-gallon porcelain pebble mill is charged with 240 grams of Para Toner Light (M: Fig. 66, page 400) and 1500 grams of a liquid grinding medium containing 11% acetone and 89% water. This is well mixed and to the mixture is added 159 grams of a rosin-modified terpene alkyd resin plastic, such as is marketed by Durex Plastics & Chemical Company under the trade name Durex 209. About 7 lbs. of #00 French flint pebbles are added. After milling for about 5 hours, the mill is discharged and rinsed out with water. The product and wash liquid are collected and filtered. The filter cake is then washed, dried and pulverized. One obtains about 392 grams of a fine bright soft-textured red powder which disperses readily into solvents, or enamel and lacquer systems, to form a highly dispersed system.

*Example 9*

A one-gallon porcelain pebble mill is charged with 240 grams of Para Toner Light (M: Fig. 66, page 400) and 1500 grams of a liquid grinding medium containing 20% acetone and 80% water. This is well mixed and to the mixture is added a dibasic modified alkyd resin plastic, such as is made by reacting maleic anhydride with rosin (abietic acid) to produce a rosin-maleic adduct, which is then reacted with glycerol to form a dibasic modified alkyd resin plastic, marketed by American Cyanamid Co. under the trade name Teglac 161. About 7 lbs. of #00 French flint pebbles are added. After milling for about 5 hours, the mill is discharged and rinsed out with water. The product and wash liquid are collected and filtered. The filter cake is then washed, dried and puverized. One obtains about 392 grams of a fine bright soft-textured red powder which disperses readily into solvents, or enamel and lacquer systems, to form a highly dispersed system.

It is to be understood that in the above examples other pigments of the character indicated earlier in the specification may be employed with satisfactory results.

With regard to the percentage of solvent in the liquid grinding medium, one may use from as little as approximately 10% to as much as about 90% by weight, depending upon the liquid organic solvents selected and the particular alkyd resin plastic to be pigmented. By the test procedure described earlier, one selects the proper ratio of water to liquid organic solvent that yields in the process optimum results.

As indicated hereinbefore, the amount of liquid grinding medium employed in the process is selected to provide a consistency suitable for optimum milling operation. As can be seen, wide variations in the amount of liquid used is possible, depending upon the amount of solids to be milled, the type of milling employed and the types of alkyd resin plastics and pigment to be blended into a plastic color master batch.

The amount of pigment used in the process, and therefore present in the final plastic color master batch, may vary from as little as about 1% to as high as approximately 95% by weight, depending on the end use. For most purposes as an alkyd resin plastic color master batch, a range of approximately 30% to 70% pigment by weight to the total weight of the color master batch is preferred.

It is in some cases advantageous to use additional materials in the milling operation to overcome certain difficulties inherent in the solids being milled, whether in the alkyd resin plastic or in the pigment. Thus, where the solids are acid or alkaline to such extent that the acidity or alkalinity, as the case may be, might adversely affect the quality of the final product, or might seriously corrode the milling equipment, one may overcome this difficulty by adding suitable buffering or neutralizing agents which are water soluble and thus capable of being easily removed during the washing operations.

It is here pointed out that one may by the process of this invention make pigmented alkyd resin plastic color batches with a mixture of pigments, in lieu of the single pigment of the above examples, and/or with a mixture of alkyd resin plastics rather than a single alkyd resin plastic, in order to obtain desired properties in the pigmented alkyd resin plastic color master batch not obtainable with a single pigment and/or with a single alkyd resin plastic.

The terms "color value" and "chromaticity" as used hereinabove and in the claims, are terms well known in the art and are employed substantially as described and discussed in "Handbook of Colorimetry" by A. C. Hardy, published by the Technology Press.

What is claimed is:

1. A process of dispersing pigment in an alkyd resin plastic which comprises milling pigment and alkyd resin plastic in a liquid grinding medium comprising water and a liquid organic water-miscible solvent in which the alkyd resin plastic is at least partially soluble, the water and solvent being present throughout the milling operation in such proportions that the liquid gringing medium does not dissolve a substantial amount of the alkyd resin plastic and does not cause substantial agglomeration of the alkyd resin plastic, the liquid grinding medium being present at all times in such amounts as to give a fluidity to the mixture which permits effective milling action, continuing the milling action until a dispersion of pigment in alkyd resin plastic is obtained, and thereafter separating the solid portion from the liquid portion of the milled mixture.

2. The process of claim 1 wherein pigment and alkyd resin plastic are each admixed with the liquid grinding medium in particulate form so that the alkyd resin plastic particles are caused to become pigment-receptive by action of the liquid grinding medium thereon and the milling action produces impinging contact of pigment particles with pigment-receptive alkyd resin plastic particles.

3. The process of claim 1 wherein the alkyd resin plastic is a polymeric material produced by the reaction of a polybasic organic acid and a polyhydroxy alcohol.

4. The process of claim 1 wherein the alkyd resin plastic is a polymeric material produced by the reaction of phthalic anhydride, glycerol and linoleic acid.

5. The process of claim 1 wherein the alkyd resin plastic is a polymeric material produced by the reaction of maleic anhydride, diglycol and styrene.

6. The process of claim 1 wherein the alkyd resin plastic is a polymeric material produced by the reaction of a polybasic organic acid, a polyhydroxy alcohol and a modifier selected from a class consisting of styrene, rosin, Congo copal, and acids of drying and non-drying oils.

7. The process of claim 6 wherein the modifier is styrene.

8. The process of claim 6 wherein the modifier is rosin.

9. The process of claim 6 wherein the modifier is linoleic acid.

10. An alkyd resin plastic color master batch consisting essentially of pigmented alkyd resin plastic in the form of dry free-flowing particles possessing a chromaticity not substantially less than the pigment portion thereof, said particles being readily dispersible in a solvent for the alkyd resin plastic to yield a colloidal dispersion of pigment in a solution of the alkyd resin plastic.

11. A process if dispersing pigment in an alkyd resin plastic which is essentially a polymeric material produced by the reaction of a polybasic organic acid adduct and a polyhydric alcohol, which comprises milling pigment and alkyd resin plastic in a liquid grinding medium comprising water and a liquid organic water-miscible solvent in which the alkyd resin plastic is at least partially soluble, the water and solvent being present throughout the milling operation in such proportions that the liquid grinding medium does not dissolve a substantial amount of the alkyd resin plastic and does not cause substantial agglomeration of the alkyd resin plastic, the liquid grinding medium being present at all times in such amounts as to give a fluidity to the mixture which permits effective milling action, continuing the milling action until a dispersion of pigment in alkyd resin plastic is obtained, and thereafter separating the solid portion from the liquid portion of the milled mixture.

12. The process of claim 11 wherein the polybasic organic acid adduct is the reaction product of dipentene and maleic acid.

13. The process of claim 11 wherein the polybasic organic acid adduct is the reaction product of maleic anhydride and rosin and the polyhydric alcohol is glycerol.

14. The process of claim 11 wherein the polybasic organic acid adduct is the reaction product of sebacic acid and castor oil.

No references cited.